United States Patent
Ko et al.

(10) Patent No.: US 7,932,839 B2
(45) Date of Patent: Apr. 26, 2011

(54) MOBILE TERMINAL AND METHOD FOR OPERATING TOUCH KEYPAD THEREOF

(75) Inventors: Dong-Seuck Ko, Gyeonggi-Do (KR); In-Yong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 655 days.

(21) Appl. No.: 11/558,415

(22) Filed: Nov. 9, 2006

(65) Prior Publication Data

US 2007/0126705 A1 Jun. 7, 2007

(30) Foreign Application Priority Data

Dec. 2, 2005 (KR) ................... 10-2005-0116717

(51) Int. Cl.
*H03M 11/00* (2006.01)
(52) U.S. Cl. ............ 341/22; 341/27; 200/311; 400/490; 345/173; 379/433.7
(58) Field of Classification Search .......... 341/27, 341/22; 200/311; 400/490; 345/173; 379/433.7
See application file for complete search history.

(56) References Cited

U.S. PATENT DOCUMENTS

| | | | | |
|---|---|---|---|---|
| 5,311,175 A * | 5/1994 | Waldman | | 341/34 |
| 5,938,772 A | 8/1999 | Welch | | |
| 5,971,761 A * | 10/1999 | Tillman, Sr. | | 434/81 |
| 6,477,390 B1 * | 11/2002 | Gum et al. | | 455/550.1 |
| 6,778,841 B1 * | 8/2004 | Bories et al. | | 455/550.1 |
| 6,850,150 B1 * | 2/2005 | Ronkainen | | 340/7.58 |
| 7,232,973 B2 * | 6/2007 | Kaps et al. | | 200/600 |
| 7,397,413 B2 * | 7/2008 | Amineh | | 341/176 |
| 7,498,534 B2 * | 3/2009 | Hoyle | | 200/314 |
| 2002/0037751 A1 | 3/2002 | Nagase | | |
| 2002/0126469 A1 * | 9/2002 | Kluser | | 362/29 |
| 2003/0034240 A1 * | 2/2003 | Duarte | | 200/311 |
| 2003/0034878 A1 * | 2/2003 | Hull et al. | | 340/5.61 |
| 2004/0127198 A1 * | 7/2004 | Roskind et al. | | 455/412.2 |
| 2006/0034065 A1 * | 2/2006 | Thurk | | 362/84 |
| 2006/0245808 A1 * | 11/2006 | Salman et al. | | 400/490 |
| 2006/0261983 A1 * | 11/2006 | Griffin et al. | | 341/27 |
| 2007/0024593 A1 * | 2/2007 | Schroeder | | 345/173 |

FOREIGN PATENT DOCUMENTS

| | | |
|---|---|---|
| GB | 2354738 | 4/2001 |
| GP | 2 354 738 | 4/2001 |
| JP | 60077560 | 5/1985 |
| JP | 5-189110 | 7/1993 |
| JP | 5189110 A | 7/1993 |
| JP | 9-247257 | 9/1997 |
| JP | 9247257 | 9/1997 |
| JP | 2002-312116 | 10/2002 |
| RU | 2003-135858 | 6/2005 |

* cited by examiner

*Primary Examiner* — Timothy Edwards, Jr.
(74) *Attorney, Agent, or Firm* — Lee, Hong, Degerman, Kang & Waimey

(57) ABSTRACT

A mobile terminal and method for operating a touch keypad, the mobile terminal including a touch keypad, a touch sensor for sensing a signal inputted from a key selected by a user on the touch keypad and outputting location information corresponding to the selected key based upon the sensed signal, a Control Processor (CPU) for outputting at least one or more control signals based upon the outputted location information, and a light emitting diode controller for independently driving a light emitting diode corresponding to the selected key based upon the outputted control signals.

22 Claims, 8 Drawing Sheets

MOBILE TERMINAL AND METHOD FOR OPERATING TOUCH KEYPAD THEREOF

CROSS-REFERENCE TO RELATED APPLICATIONS

Pursuant to 35 U.S.C. §119(a), this application claims the benefit of earlier filing date and right of priority to Korean Application No. 116717/2005, filed on Dec. 2, 2005, the contents of which is hereby incorporated by reference herein in its entirety.

FIELD OF THE INVENTION

The present invention is directed to a mobile terminal, and specifically, to a mobile terminal and method for operating a touch keypad capable of improving user's convenience.

DESCRIPTION OF THE RELATED ART

A mobile communications terminal is a communication device capable of providing a call to another party via a wireless connection anytime and anywhere under switching control of an MSC (Mobile Switching Center) while moving within a service region of a BS (Base Station). Mobile communications terminals having a large display device and a camera function for capturing videos, or moving pictures and images are recently gaining popularity.

Mobile communications terminals are often provided with various additional services, such as a camera function, an MP3 (MPEG Audio Layer 3) playback function, an Internet function and a SMS (Short Messaging Service) function, in addition to typical communication functions in order to provide a user with more convenience and communications applications. Furthermore, the shapes (appearances) of the mobile communications terminals and User Interfaces (UIs) are designed based on the various additional functions that are provided.

Portable mobile communications terminal is being manufactured smaller, lighter and slimmer for its easy carrying. Accordingly, corresponding components may be replaced. Toward this end, it may be useful to provide a mobile communications terminal with a touch keypad for operation.

A related art mobile communications terminal for operating an art touch keypad is provided with an Integrated Circuit (IC) for sensing a signal at each preset portion of the touch keypad, specifically, at every point to be touched, in order to enable performance of an operation corresponding to a selected key based upon the signal input from the IC. However, the related art mobile communications terminal for operating a touch keypad has the IC located on the touch keypad. Accordingly, the selected key is indicated only by a user's sense, and therefore, it is difficult for the user to recognize the selected key.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings. An object of the present invention is to provide a mobile terminal and method for operating a touch keypad capable of improving user convenience by enabling the user to easily recognize a selected key by independently driving only a light emitting diode corresponding to the key selected by the user.

In one aspect of the invention, a method for operating a touch keypad of a mobile terminal, the touch keypad having a plurality of keys and at least one light emitting unit associated with each of the plurality of keys, is provided. The method includes sensing a signal input from a selected one of the plurality of keys, the signal generated by a user touching the selected key, and illuminating the light emitting unit associated with the selected key independent of the light emitting units associated with the non-selected keys such that the user can recognize the selected key.

It is contemplated that the method further includes generating an audible indication of the selected key. It is further contemplated that the method further includes generating a vibration to indicate that one of the plurality of keys was selected.

It is contemplated that illuminating the light emitting unit associated with the selected key includes turning off the light emitting units associated with the non-selected keys. It is further contemplated that illuminating the light emitting unit associated with the selected key includes illuminating the light emitting unit associated with the selected key such that it emits a different color than the light emitting units associated with the non-selected keys.

It is contemplated that illuminating the light emitting unit associated with the selected key includes illuminating the light emitting unit associated with the selected key such that it blinks. It is further contemplated that the method further includes turning off the light emitting units associated with the non-selected keys.

It is contemplated that the method further includes illuminating the light emitting units associated with the non-selected keys such that they emit a constant light. It is further contemplated that illuminating the light emitting unit associated with the selected key includes illuminating the light emitting units associated with the non-selected keys such that they emit a constant light of a first magnitude and illuminating the light emitting unit associated with the selected key such that it emits a constant light of a second magnitude, wherein the second magnitude is greater than the first magnitude. Preferably, the method further includes generating one of an audible indication of the selected key, a vibration to indicate that one of the plurality of keys was selected and both the audible indication and the vibration, the generating performed according to a preset option, the preset option based upon a mode, a time of day and/or a level of illuminance of external light.

In another aspect of the present invention, a mobile terminal is provided. The mobile terminal includes a transceiving unit adapted to transmit and receive signals, a touch keypad having a plurality of keys adapted to allow a user to enter information, each of the plurality of keys having an associated light emitting unit, and a control unit adapted to sense a signal input from a selected one of the plurality of keys when a user touches the selected key and to illuminate the light emitting unit associated with the selected key independent of the light emitting units associated with the non-selected keys such that the user can recognize which of the plurality of keys was touched.

It is contemplated that the terminal further includes an alarm unit and wherein the control unit is further adapted to control the alarm unit to generate an audible indication of the selected key. It is further contemplated that the terminal further includes a vibration unit and the control unit is further adapted to control the vibration unit to generate a vibration to indicate that one of the plurality of keys was selected.

It is contemplated that the control unit is further adapted to turn off the light emitting units associated with the non-selected keys and turn on the light emitting unit associated with the selected key. It is further contemplated that the control unit is further adapted to illuminate the light emitting unit associated with the selected key such that it emits a different color than the light emitting units associated with the non-selected keys.

It is contemplated that the control unit is further adapted to illuminate the light emitting unit associated with the selected key such that it blinks and illuminate the light emitting units associated with the non-selected keys such that they emit a constant light. It is further contemplated that the control unit is further adapted to illuminate the light emitting units associated with the non-selected keys such that they emit a constant light of a first magnitude and illuminate the light emitting unit associated with the selected key such that it emits a constant light of a second magnitude, wherein the second magnitude is greater than the first magnitude.

It is contemplated that the terminal further includes an alarm unit and a vibration unit and the control unit is further adapted to detect a preset option and either control the alarm unit to generate an audible indication of the selected key, control the vibration unit to generate a vibration to indicate that one of the plurality of keys was selected and control both the alarm unit to generate the audible indication and the vibration unit to generate the vibration. It is further contemplated that the preset option is based upon either a mode, a time of day or a level of illuminance of external light.

It is contemplated that the mode includes either normal and manner and the control unit is further adapted to either control the alarm unit to generate the audible indication or control both the alarm unit to generate the audible indication and the vibration unit to generate the vibration in normal mode and to control the vibration unit to generate the vibration in manner mode. It is further contemplated that the time of day includes one of morning, afternoon and night and the control unit is further adapted to control the vibration unit to generate the vibration in the morning and afternoon and either control the alarm unit to generate the audible indication or control both the alarm unit to generate the audible indication and the vibration unit and the vibration at night.

It is contemplated that the level of illuminance includes either a bright area and a dark area and the control unit is further adapted to control both the alarm unit and the vibration unit to generate the audible indication and the vibration in a bright area and either control the alarm unit to generate the audible indication, control the vibration unit the generate the vibration or control both the alarm unit and the vibration unit to generate the audible indication and the vibration in a dark area. It is further contemplated that the control unit includes a touch sensor processor adapted to sense the signal input from the selected key and output location information corresponding to the selected key based upon the sensed signal, a control processor unit (CPU) adapted to output at least one control signal according to the location information and a light emitting unit controller adapted to independently drive the light emitting unit associated with the selected key according to the at least one control signal.

It is contemplated that the terminal further includes an Inter IC Bus (IC) controller adapted to provide an IC interface between the touch sensor processor and the CPU and between the CPU and the light emitting unit controller. It is further contemplated that the terminal further includes a memory adapted to store location information corresponding to each of the plurality of keys.

It is contemplated that the CPU is further adapted to output a control signal for controlling the light emitting unit associated with the selected key based upon the key location information from the touch sensor processor and the location information stored in the memory. It is further contemplated that the touch keypad includes capacitors arranged in an arbitrary form.

It is contemplated that the touch sensor processor is further adapted to sense a signal input from the selected key according to changes in capacitance values. It is further contemplated that the touch keypad further includes a first unit providing the light emitting units associated with the plurality of keys, a second unit providing guiding portions adapted to guide light from each light emitting unit to the associated one of the plurality of keys and a touch keypad panel providing the plurality of keys. Preferably, the touch keypad includes a first unit providing the light emitting units associated with the plurality of keys, a second unit providing guiding portions adapted to guide light from each light emitting unit to the associated one of the plurality of keys and additional light emitting units adapted to provide backlighting for the plurality of keys and a touch keypad panel providing the plurality of keys.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

With respect to the attached drawings, explanation will be given of preferred embodiments of a mobile terminal and method for operating a touch keypad capable of improving convenience of a user by which the user can easily recognize a selected key by independently operating only a light emitting diode corresponding to a key selected by the user on the touch keypad. The mobile terminal to which the present invention may be applied is not limited to mobile phones but rather includes Personal Digital Assistants (PDAs), notebooks and Portable Multimedia Players (PMPs), all of which use a keypad.

Figure 1:
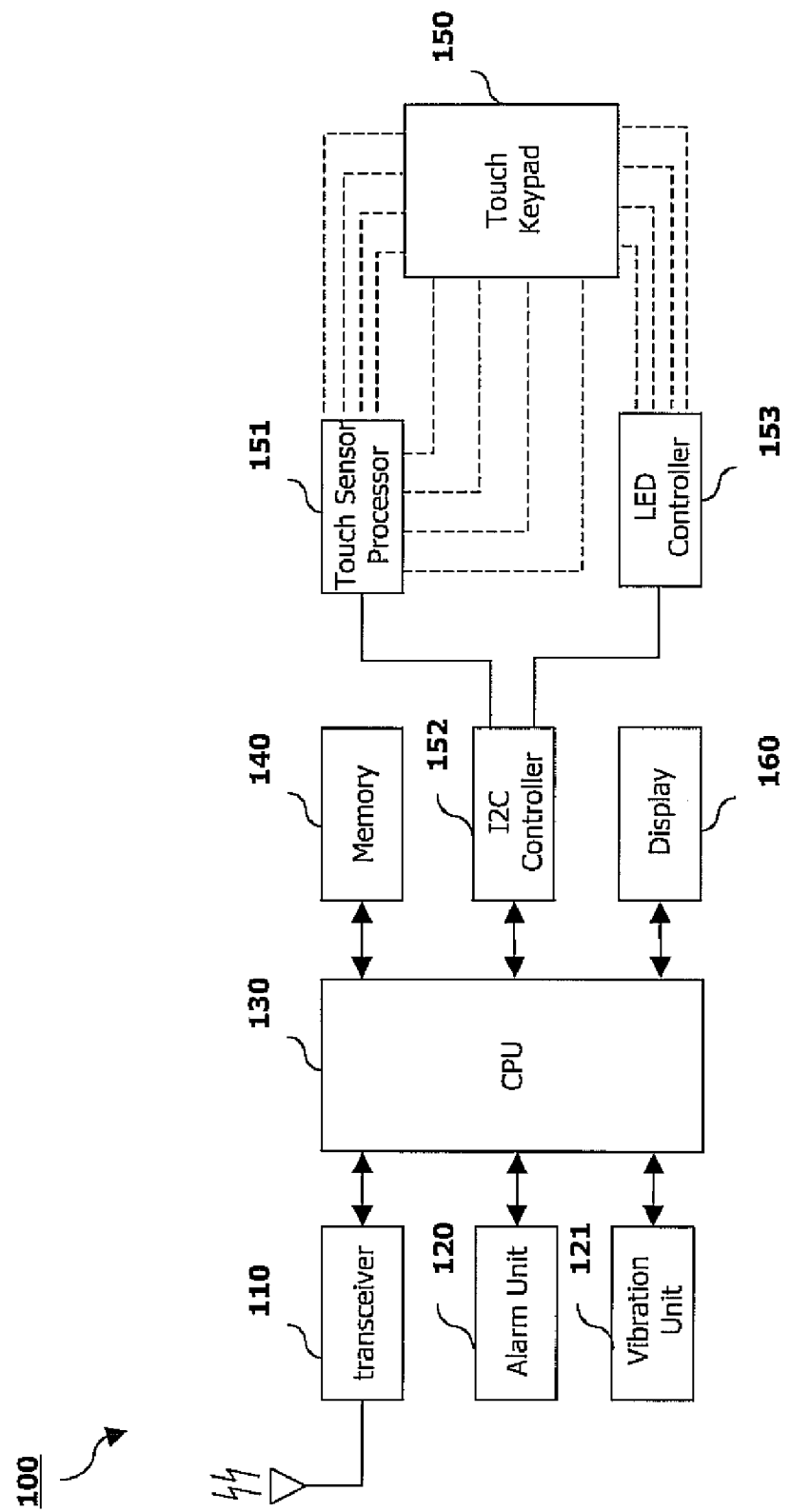
FIG. 1 is a block diagram illustrating a structure of a mobile terminal for operating a touch keypad according to the present invention.

FIG. 1 is a block diagram illustrating a structure of a mobile terminal 100 for operating a touch keypad according to the present invention. As illustrated in FIG. 1, the mobile terminal 100 may include a transceiver 110, a touch keypad 150, a touch sensor processor 151 for sensing a signal input from a key selected by a user on the touch keypad and outputting location information corresponding to the selected key based upon the sensed signal, a Control Processing Unit (CPU) 130 for outputting one or more control signals based upon the outputted location information, a light emitting diode (LED) controller 153 for independently driving the light emitting diode corresponding to the selected key based upon a first control signal, an alarm unit 120 for outputting an alarm sound corresponding to the selected key based upon a second control signal, a vibration unit 121 for generating a vibration corresponding to the selected key based upon a third control signal, an Inter IC Bus (I2C) controller 152 for providing an I2C interface between the touch sensor processor and the CPU and between the CPU and the light emitting diode controller and a memory 140 for storing an arbitrary key on the touch keypad and location information corresponding to the arbitrary key. The light emitting diode controller 153 turns off the light emitting diodes corresponding to non-selected keys, specifically all keys except for the selected key, such that the user can easily recognize the selected key.

The touch keypad 150 may be implemented in various shapes on various positions according to a type of mobile terminal, for example, a slide type, a folder type, or a swing type. Explanation of the present invention will be with respect to structure of the touch keypad of the mobile terminal.

Figure 2:
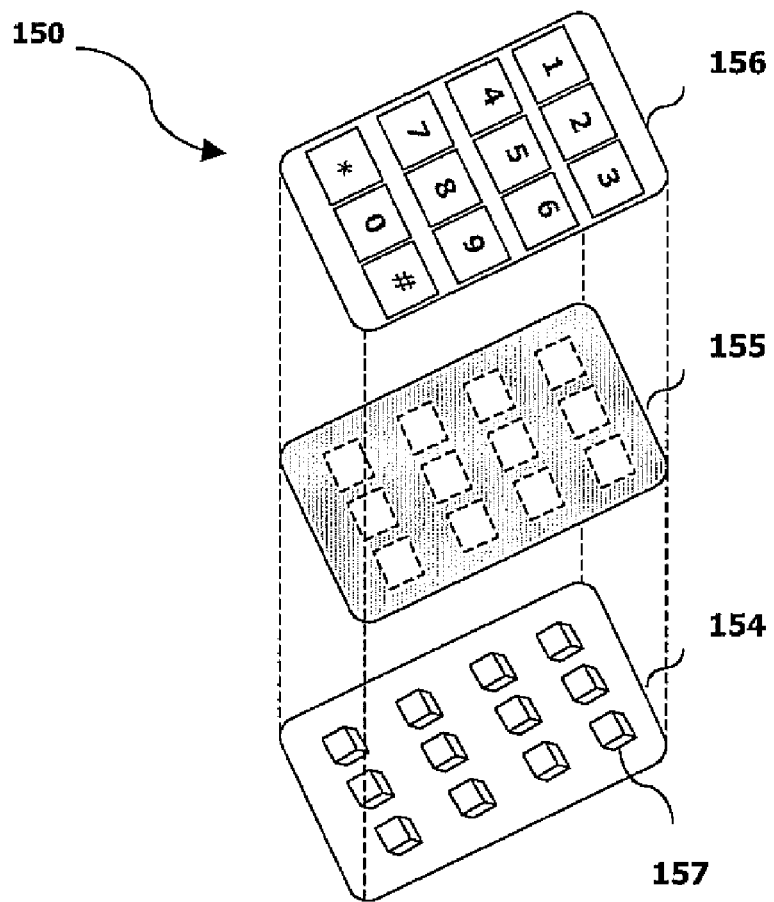
FIG. 2 illustrates a structure of a touch keypad of a mobile terminal according to the present invention.
Figure 2:
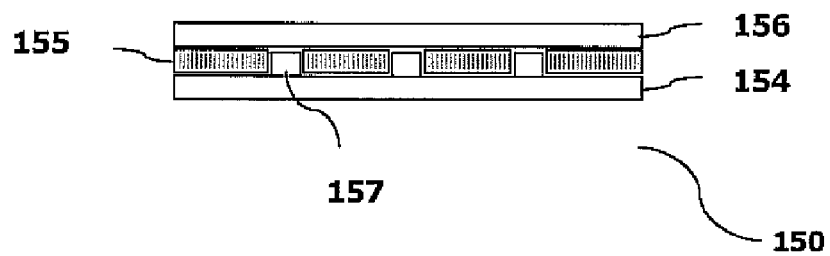

FIG. 2 illustrates a structure of a touch keypad of a mobile terminal according to the present invention. As illustrated in FIG. 2, the touch keypad 150 according to the present invention may include a first Printed Circuit Board (PCB) 154 provided with a plurality of light emitting diodes, a second PCB 155 provided above the first PCB such that each of the light emitting diodes corresponds to an arbitrary key, and a touch keypad panel 156 provided above the second PCB and having a touch keypad.

LEDs for providing backlight for the keys of the touch keypad 150 and a guide portion for providing light from each of the LEDs to a corresponding key of the keypad may be provided on the second PCB 155. The second PCB 155 may be an EL (OLED) sheet.

The second PCB 155 may have a plurality of grooves into which the light emitting diodes are inserted. Each groove penetrates upper and lower portions of the second PCB 156 to allow light emitting diodes to be inserted. The touch keypad 150 may be implemented in various shapes.

Figure 3:
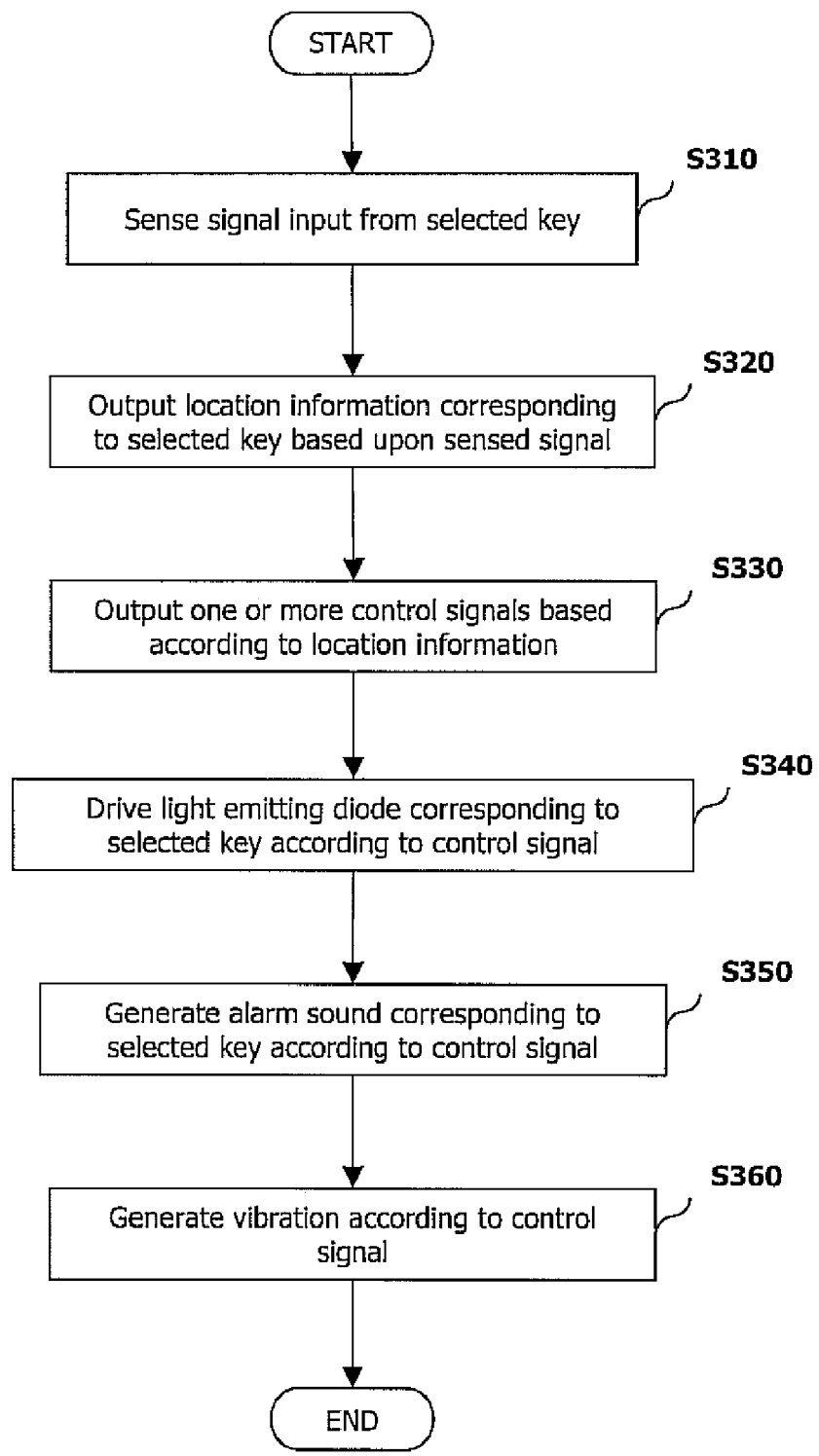
FIG. 3 is a flowchart illustrating a method for operating a touch keypad of a mobile terminal according to the present invention.

FIG. 3 illustrates a flowchart of a method for operating a touch keypad of a mobile terminal according to the present invention. As illustrated in FIG. 3, the method may include sensing a signal inputted from a key selected by a user on a touch keypad (S310), outputting location information corresponding to the selected key based upon the sensed signal (S320), outputting one or more control signals based upon the location information (S330), independently driving a light emitting diode corresponding to the selected key according to a first control signal (S340), generating an alarm sound corresponding to the selected key according to a second control signal (S350), and generating a vibration corresponding to the selected key based upon a third control signal (S360).

The touch keypad 150 is provided with not only light emitting diodes for performing a backlight function but also light emitting diodes for facilitating recognition of a selected key, whereby all of the light emitting diodes may be driven or turned on, and also a light emitting diode corresponding to the selected key can be independently driven. The light emitting diodes preferably are three-color LEDs. Furthermore, the mobile communications terminal 100 may independently drive the light emitting diode corresponding to the selected key and simultaneously generate an alarm sound or vibration corresponding to the selected key.

The touch sensor processor 151 senses a signal input from a key selected by a user on the touch keypad (S310) and outputs location information corresponding to the selected key based upon the sensed signal (S320). The touch sensor processor 151 calculates the location information based upon the sensed signal and outputs the calculated information to the CPU 130 via the I2C controller 152. The CPU 130 can then perform an operation according to the selected key on the touch keypad 150. Preferably, the touch sensor processor 151 is implemented as a System on Chip (SoC) device, which can replace tens of mechanical switches and regulators.

Figure 4:
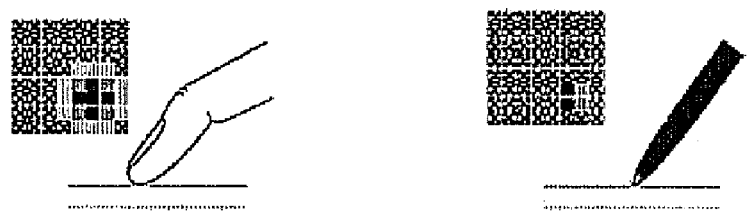
FIG. 4 illustrates a principle for sensing location information of a touch sensor processor according to the present invention.
Figure 4:
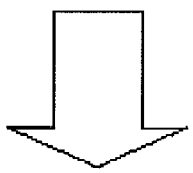
Figure 4:
Figure 4:
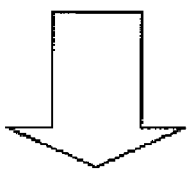
Figure 4:
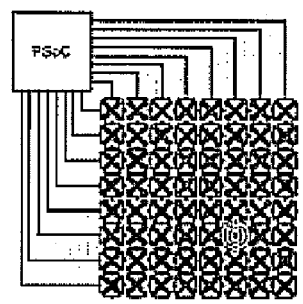

FIG. 4 illustrates a principle for sensing location information of the touch sensor processor 151 according to the present invention. As illustrated in FIG. 4, in the touch sensor processor 151, when an arbitrary portion of the touch keypad is selected or touched, for example, with a user's finger or a pen, capacitance values are generated by the finger or pen in addition to a capacitance value generated between touch sensors positioned at the selected location. As a result, a certain number of sawtooth waves are generated for a certain time according to a clock by the capacitance value generated between the touch sensors at the selected location. The capacitance values generated from the finger or pen increase a time constant of the sawtooth waves, which results in a decrease of the number of sawtooth waves generated according to the clock for the certain time. Accordingly, the touch sensor processor 151 can sense the location of the selected key.

The CPU 130 outputs one or more control signals for controlling an output of one or more output units, for example, the light emitting diodes, the alarm unit 120, and the vibration unit 121 according to location information (S330). That is, the CPU 130 can output a control signal to the light emitting diode controller 153 via the I2C controller 152 for controlling the light emitting diode corresponding to the selected key, the control signal based on the location information and information previously stored in the memory 140.

The I2C controller 152 facilitates data communication between the touch sensor processor 151 and the CPU 130 or between the CPU and the light emitting diode controller 153 via an I2C interface. The I2C interface, which is a bus for communication between the CPU 130 and various I/O devices, generally uses a Serial Clock Line (SCL) for transmitting a clock and a Serial Data Line (SDA) for transmitting data. In addition, the I2C controller 152 may provide an Interrupt ReQuest (IRQ) line for controlling a direction of the data transmission via the SDA.

Accordingly, the light emitting diode controller 153 independently drives the light emitting diode corresponding to the selected key based upon a first control signal (S340). The alarm unit 120 outputs an alarm sound corresponding to the selected key based upon a second control signal (S350). The vibration unit 121 generates a vibration corresponding to the selected key based upon a third control signal (S360).

The light emitting diode controller 153 may drive the light emitting diode corresponding to the selected key such that the selected key blinks. The light emitting diode controller 153 may drive the light emitting diodes corresponding to the other keys such that they emit a constant light.

When independently driving the light emitting diode corresponding to the selected key, the light emitting diode controller 153 can turn off the light emitting diodes that provide the touch keypad 150 with a backlight function or control the LEDs to emit light of a different color than the color emitted by the light emitting diode corresponding to the selected key. That is, the light emitting diode controller 153 can control the light emitting diode corresponding to the selected key and the light emitting diodes providing the backlight function in order to allow a user to easily recognize the selected key.

The mobile communications terminal 100 according to the present invention can provide light-emission, an alarm sound and/or vibration for facilitating a user's recognition of a selected key in several ways according to various environments. Several examples are provided.

First, whether an alarm sound or a vibration is generated may be determined based upon modes. For a normal mode, light-emission and an alarm sound or light-emission, an alarm sound and vibration may be generated, whereas for a manner mode, light-emission and vibration may be generated.

Second, whether an alarm signal or a vibration is generated may be determined based upon time of day. In the morning or in the afternoon, most time is spent in offices or schools, and accordingly light-emission and vibration may be generated, whereas at night, most time is spent at home and, accordingly, light-emission and an alarm sound or, light-emission, an alarm sound and vibration may be generated.

Third, whether an alarm signal or a vibration is generated may be determined based upon luminance. In a bright area, it is difficult to recognize light-emission and, accordingly an alarm sound or vibration may be generated, whereas in a dark area, light-emission and an alarm sound or light-emission and vibration or light-emission, an alarm sound and vibration may be generated.

Figure 5A:
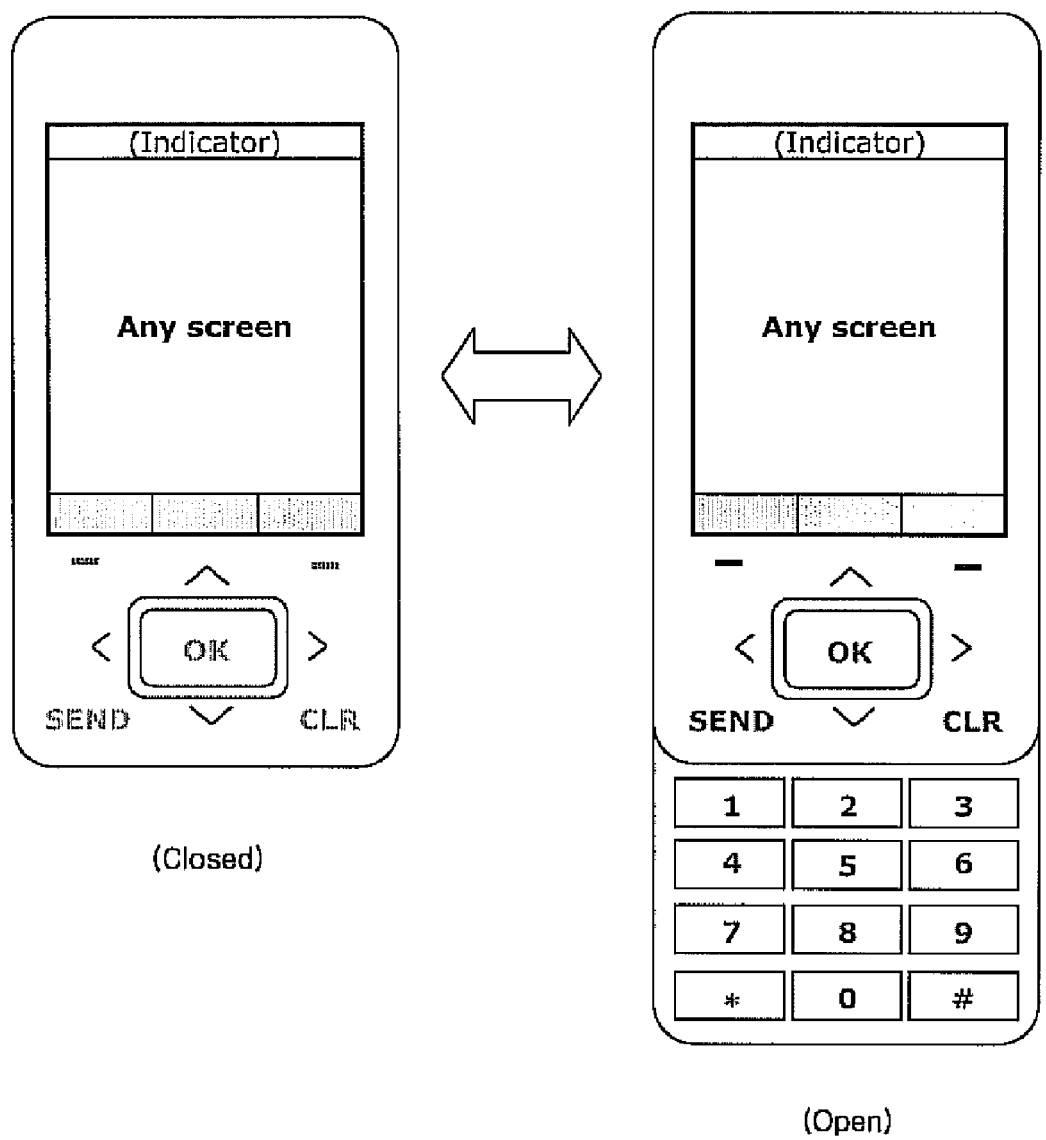
FIGS. 5A through 5D illustrates a principle for using a touch keypad of a mobile terminal according to the present invention.

FIGS. 5A through 5D are views illustrating a principle for employing a touch keypad 150 of a mobile terminal 100 according to the present invention. As illustrated in FIG. 5A, the touch keypad 150 can provide the backlight function. When the mobile terminal 100 is closed all the light emitting diodes may be turned off, and when the mobile terminal it is opened, all the light emitting diodes may be driven, or turned on.

Figure 5B:
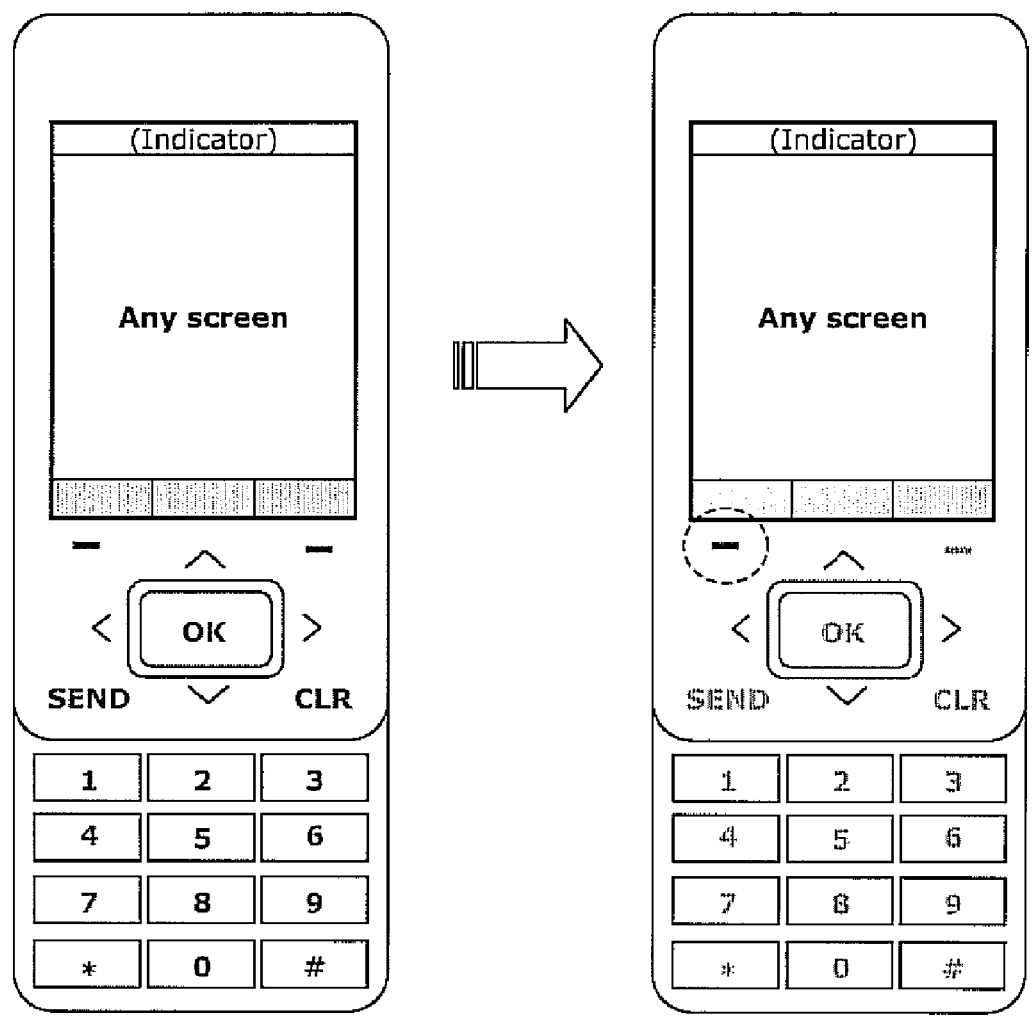
Figure 5C:
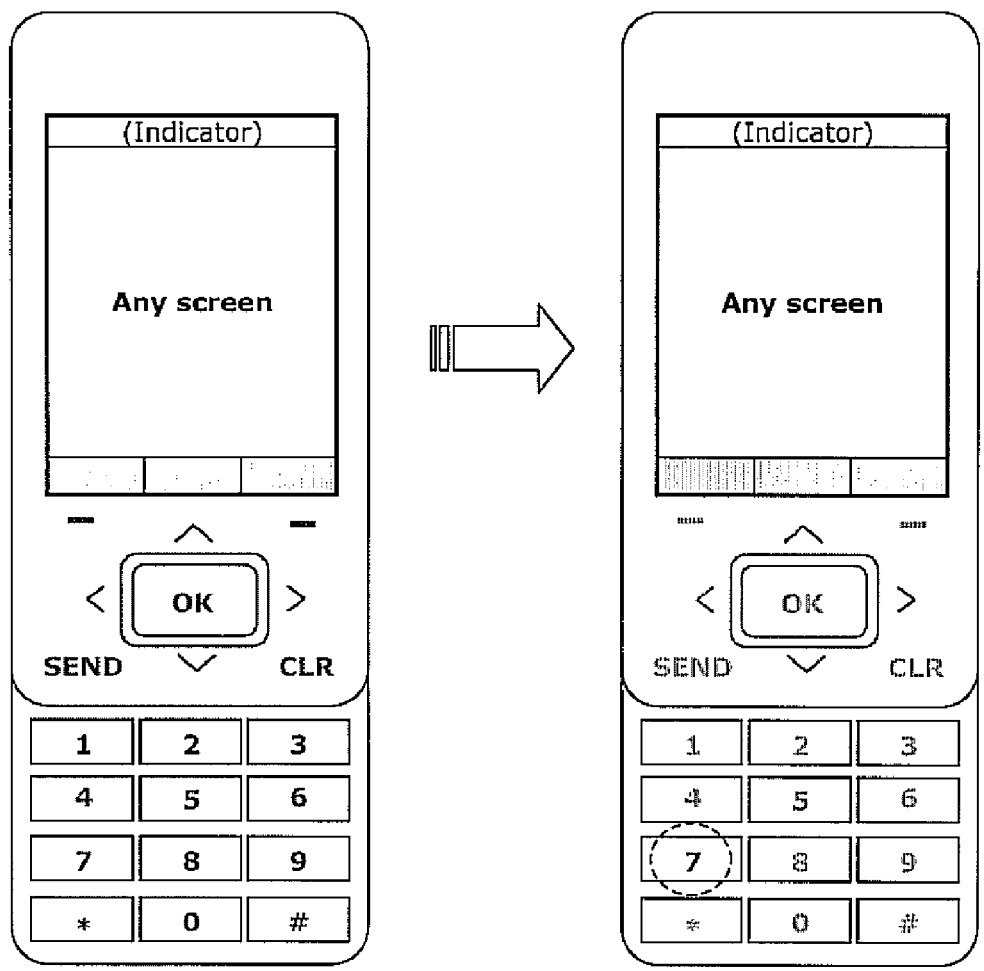

As illustrated in FIGS. 5B and 5C, when a user selects an arbitrary key, such as a menu key (-) or a numeral key (7-key) to search for a menu or place a call in an active state of the mobile terminal 100, the touch keypad 150 can independently drive the light emitting diode related to the selected key in order to facilitate a user's recognition of the selected key and can turn off all light emitting diodes corresponding to other keys.

In a dimming mode, the touch keypad 150 can turn off all the light emitting diodes, and when a user selects an arbitrary key, the touch keypad can independently drive the light emitting diode corresponding to the selected key and turn off all the light emitting diodes corresponding to other keys. Thereafter, in addition to independently driving the light emitting diode corresponding to the selected key, an amount of the light emitted by a light emitting diode corresponding to the selected key is increased and an amount of the light emitted by light emitting diodes corresponding to the other keys is decreased to thereby facilitate a user's recognition of the selected key.

Figure 5D:
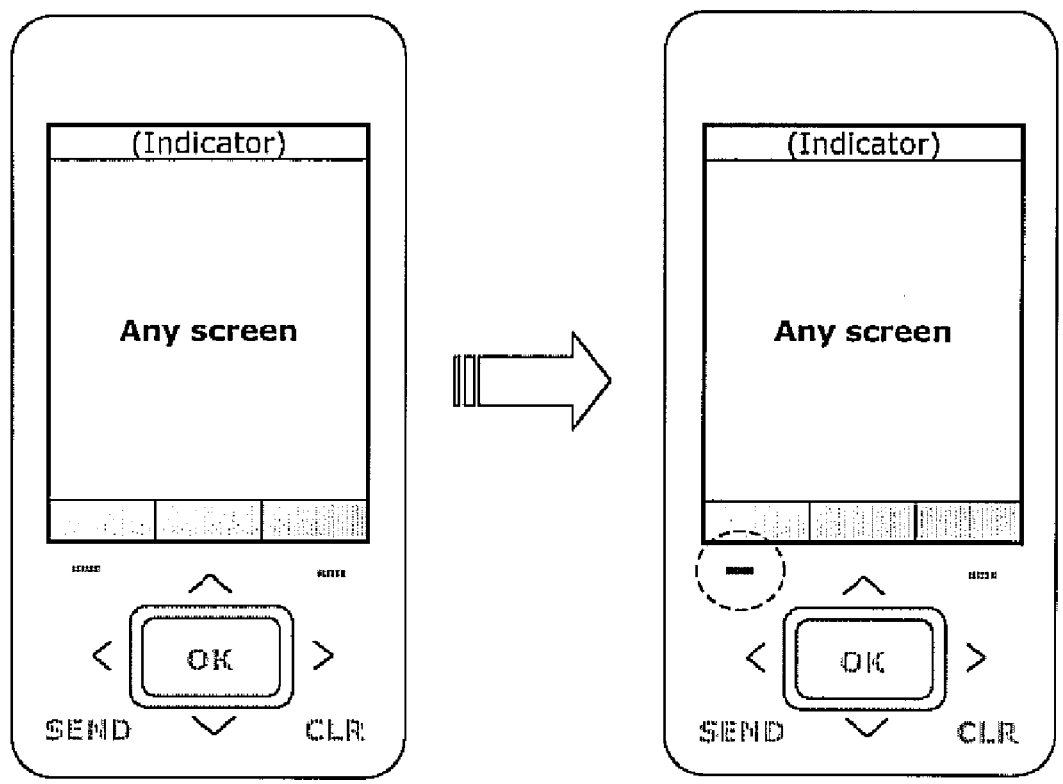

As illustrated in FIG. 5D, even when the mobile terminal 100 is closed, the touch keypad 150 can be activated. Specifically all the light emitting diodes can be driven by a preset function key in order to perform functions such as phone book search or text message confirmation.

The touch keypad 150 can independently drive only the light emitting diode corresponding to the selected key. Also, the light emitting diodes corresponding to respective keys on the touch keypad 150 may be implemented such that each light emitting diode can emit light with different color by using LEDs which can render various colors. For example, when the light emitting diode corresponding to the key selected by the user is driven to emit light, the light emitting diodes corresponding to non-selected keys can be turned off or can be driven to emit light with a corresponding color that is different from the color of the light emitted from the light emitting diode corresponding to the selected key.

The touch keypad 150 can be implemented such that the light emitting diodes can emit light with various colors other than the three basic colors by a combination of different colors of the LED (i.e., the three-color LED) that can render various colors.

As described in the mobile terminal and method for operating a touch keypad according to the present invention can independently drive the light emitting diode corresponding to the key selected by the user on the touch keypad in order to facilitate a user's recognition of the selected key. As a result, user convenience is effectively improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalents of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for operating a touch keypad of a mobile terminal having a plurality of keys, the method comprising:

sensing a signal input from a selected key of the plurality of keys, the signal input generated by a user touching the selected key; and generating at least an audible indication of the selected key or a vibration to indicate that one of the plurality of keys was selected in response to the sensed signal input, wherein the generating is performed according to a preset option based upon a mode, a time of day or a level of illuminance of external light.

2. The method of claim 1, further comprising:

illuminating a light emitting unit associated with the selected key independent of light emitting units associated with non-selected keys such that the user can recognize the selected key; and
turning off the light emitting units associated with the non-selected keys.

3. The method of claim 1, further comprising illuminating a light emitting unit associated with the selected key independent of light emitting units associated with non-selected keys such that the user can recognize the selected key,
wherein the light emitting unit associated with the selected key emits a different color than the light emitting units associated with the non-selected keys.

4. The method of claim 1, further comprising illuminating a light emitting unit associated with the selected key independent of light emitting units associated with non-selected keys such that the user can recognize the selected key,
wherein illuminating the light emitting unit associated with the selected key comprises:
illuminating the light emitting units associated with the non-selected keys such that the light emitting units associated with the non-selected keys emit a constant light of a first magnitude; and
illuminating the light emitting unit associated with the selected key such that the light emitting unit associated with the selected key emits a constant light of a second magnitude that is greater than the first magnitude.

5. The method of claim 1, further comprising illuminating a light emitting unit associated with the selected key independent of light emitting units associated with non-selected keys such that the user can recognize the selected key,
wherein the light emitting unit associated with the selected key blinks.

6. The method of claim 5, further comprising turning off the light emitting units associated with the non-selected keys.

7. The method of claim 5, further comprising illuminating the light emitting units associated with the non-selected keys such that the light emitting units associated with the non-selected keys emit a constant light.

8. A mobile terminal, comprising:
a transceiving unit adapted to transmit and receive signals;
a touch keypad having a plurality of keys adapted to receive a user input comprising touching at least one of the plurality of keys;
a control unit adapted to sense a signal input from a selected key of the plurality of keys when a user touches the selected key;
an alarm unit; and
a vibration unit,
wherein the control unit is further adapted to detect a preset option and control at least the alarm unit to generate an audible indication of the selected key or the vibration unit to generate a vibration to indicate that one of the plurality of keys was selected, and
wherein the preset option is based upon a mode, a time of day or a level of illuminance of external light.

9. The terminal of claim 8, wherein the touch keypad further comprises light emitting units associated with each of the plurality of keys and the control unit is further adapted to:
illuminate a light emitting unit associated with the selected key independent of light emitting units associated with the non-selected keys such that the user can recognize the selected key;
turn off the light emitting units associated with the non-selected keys; and
turn on the light emitting unit associated with the selected key.

10. The terminal of claim 8, wherein:
the touch keypad further comprises light emitting units associated with each of the plurality of keys;
the control unit is further adapted to illuminate a light emitting unit associated with the selected key independent of light emitting units associated with the non-selected keys such that the user can recognize the selected key; and
the light emitting unit associated with the selected key emits a different color than the light emitting units associated with the non-selected keys.

11. The terminal of claim 8, wherein:
the touch keypad further comprises light emitting units associated with each of the plurality of keys;
the control unit is further adapted to illuminate a light emitting unit associated with the selected key independent of light emitting units associated with the non-selected keys such that the user can recognize the selected key;
the light emitting unit associated with the selected key is illuminated and configured to blink; and
the light emitting units associated with the non-selected keys are illuminated and configured to emit a constant light.

12. The terminal of claim 8, wherein:
the touch keypad further comprises light emitting units associated with each of the plurality of keys;
the control unit is further adapted to illuminate a light emitting unit associated with the selected key independent of light emitting units associated with the non-selected keys such that the user can recognize the selected key;
the light emitting units associated with the non-selected keys are illuminated and configured to emit a constant light of a first magnitude; and
the light emitting unit associated with the selected key is illuminated and configured to emit a constant light of a second magnitude that is greater than the first magnitude.

13. The terminal of claim 8, wherein:
the mode comprises normal or manner;
the control unit is further adapted to control the alarm unit to generate only the audible indication or control both the alarm unit to generate the audible indication and the vibration unit to generate the vibration in the normal mode; and
the control unit is further adapted to control only the vibration unit to generate the vibration in the manner mode.

14. The terminal of claim 8, wherein:
the time of day comprises morning, afternoon or night;
the control unit is further adapted to control only the vibration unit to generate the vibration in the morning and afternoon; and
the control unit is further adapted to control only the alarm unit to generate the audible indication at night or control both the alarm unit to generate the audible indication and the vibration unit to generate the vibration at night.

15. The terminal of claim 8, wherein:
the level of illuminance comprises a bright area or a dark area;
the control unit is further adapted to control both the alarm unit to generate the audible indication and the vibration unit to generate the vibration in the bright area; and
the control unit is further adapted to control at least the alarm unit to generate the audible indication or the vibration unit to generate the vibration in the dark area.

16. The terminal of claim 8, wherein the touch keypad further comprises:
   a first unit providing light emitting units associated with each of the plurality of keys;
   a second unit providing guiding portions adapted to guide light from each light emitting unit to the associated one of the plurality of keys; and
   a touch keypad panel providing the plurality of keys.

17. The terminal of claim 8, wherein the touch keypad further comprises light emitting units associated with each of the plurality of keys and the control unit comprises:
   a touch sensor processor adapted to sense the signal input from the selected key and output location information corresponding to the selected key based upon the sensed signal;
   a control processor unit (CPU) adapted to output at least one control signal according to the location information; and
   a light emitting unit controller adapted to independently drive the light emitting unit associated with the selected key according to the at least one control signal.

18. The terminal of claim 17, further comprising an Inter IC Bus (I2C) controller adapted to provide an I2C interface between the touch sensor processor and the CPU and between the CPU and the light emitting unit controller.

19. The terminal of claim 17, further comprising a memory adapted to store location information corresponding to each of the plurality of keys.

20. The terminal of claim 19, wherein the CPU is further adapted to output a control signal for controlling the light emitting unit associated with the selected key based upon the key location information from the touch sensor processor and the location information stored in the memory.

21. The terminal of claim 17, wherein the touch keypad further comprises capacitors arranged in an arbitrary form.

22. The terminal of claim 21, wherein the touch sensor processor is further adapted to sense a signal input from the selected key according to changes in capacitance values.

* * * * *